Oct. 17, 1944.  W. A. ASHTON  2,360,535
HYDRAULIC LOCKING MECHANISM
Filed Aug. 12, 1942  2 Sheets-Sheet 1
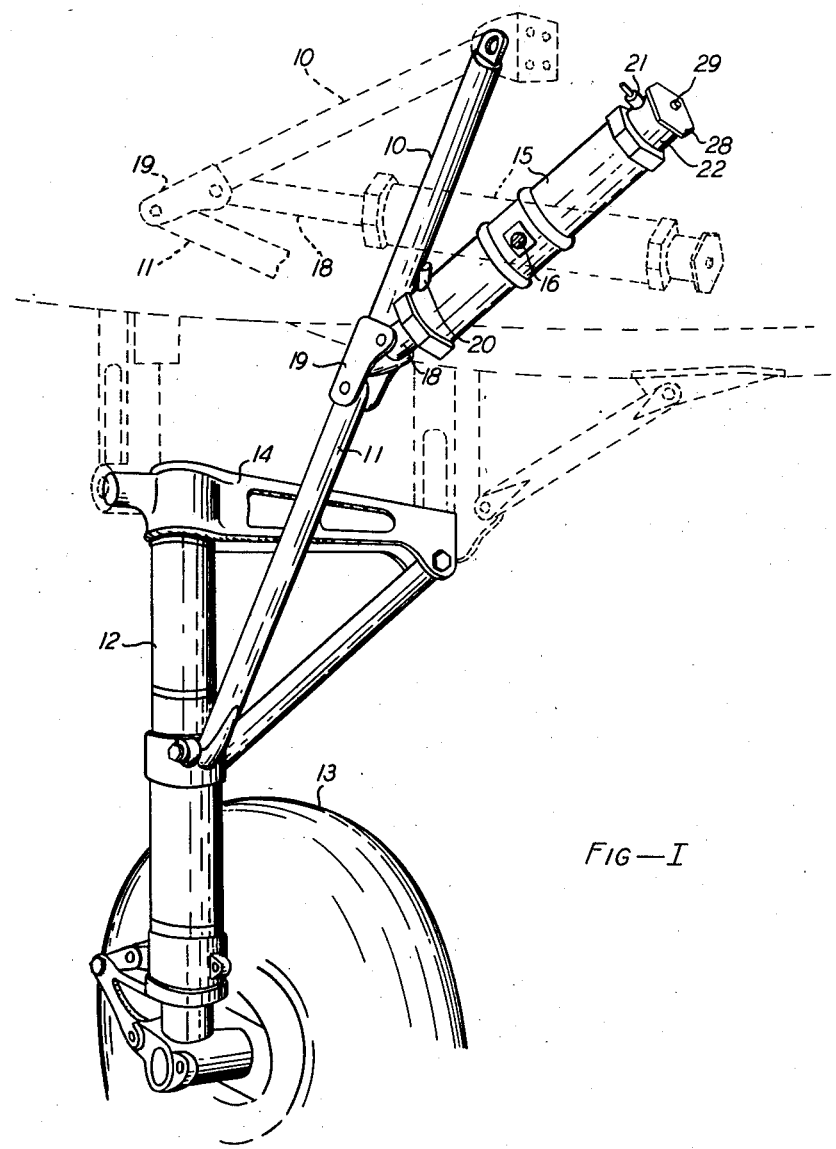
FIG-I
INVENTOR
WILLARD A. ASHTON
BY George C. Sullivan

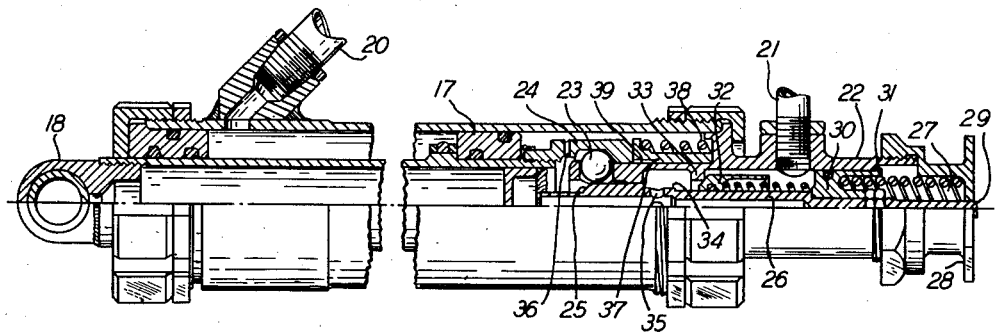
Fig—II
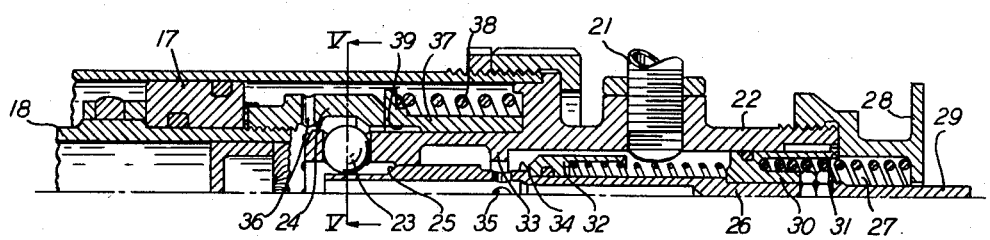
Fig—III
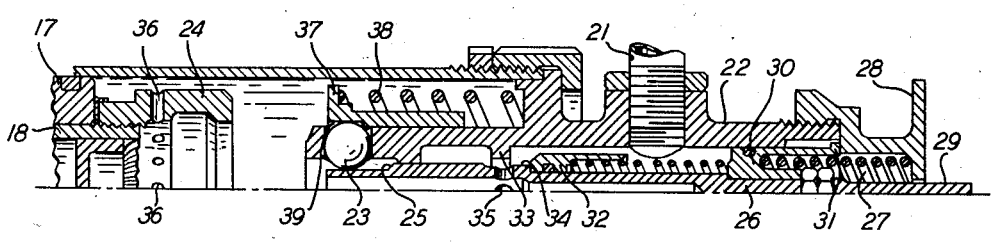
Fig—IV
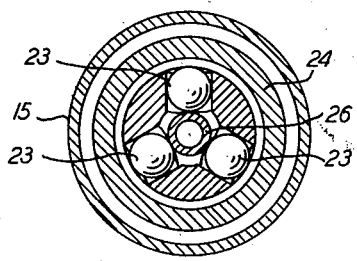
Fig—V
INVENTOR
WILLARD A. ASHTON
BY George C. Sullivan Patented Oct. 17, 1944

2,360,535

UNITED STATES PATENT OFFICE 2,360,535

HYDRAULIC LOCKING MECHANISM

Willard A. Ashton, Van Nuys, Calif., assignor, by mesne assignments, to Lockheed Aircraft Corporation, a corporation of California Application August 12, 1942, Serial No. 454,575

12 Claims. (Cl. 121—40)

This invention relates to locking means for hydraulically operated mechanisms, to retain the same against accidental movement, and has special reference to such mechanisms for operating retractable landing gear on aircraft.

Aircraft hydraulic systems may be used for operating a number of varied control and service functions, some of which operate more or less continuously, others provide an "inching" control as in adjusting extensible flaps, and still others operate to one or the other extreme. An example of the latter is found in retractable landing gears, which can readily be held retracted by maintaining hydraulic pressure in the operating cylinders, since such pressure is available while the engines are running. However, when the aircraft has landed and is left on its wheels for some time, the hydraulic pressure may leak off or be released for service work on the system, so that some safety device is necessary to prevent unexpected collapse of the landing gear. It is further desirable to have such a safety device function automatically whenever the gear is extended since an awkward landing or even usual landing shock might tend to collapse the gear and result in damage to the aircraft.

Accordingly, it is an object of this invention to provide an improved and simplified automatic lock for hydraulic actuated mechanisms such as jacks or operating cylinders, wherein a reciprocating operating member can be positively locked at one extremity of its motion, and unlocked by the application of hydraulic pressure in the opposite direction.

It is a further object of this invention to provide an improved and simplified lock for double acting hydraulic operating cylinders wherein the reversal of hydraulic pressure on the operating cylinder releases the locking mechanism prior to the application of pressure to the operating mechanism itself, which is thus protected against the application of pressure while the lock is functioning to hold the operating cylinder in a predetermined position.

It is also an object of this invention to provide a self contained and self energizing lock of the class described that is engaged by the movement of the operating mechanism to one extreme, and is held inoperative when the operating mechanism is out of contact therewith, thus preventing premature operation of the lock, which would prevent completion of the stroke of the operating mechanism.

Other and further important objects of this invention will be apparent from the disclosures in the specification and the accompanying drawings.

This invention in its preferred form is illustrated in the drawings and hereinafter more fully described.

In the drawings:

Figure I is a perspective view of an airplane landing wheel and shock strut combination including a hydraulic retracting jack embodying the features of this invention.

Figure II is a partial longitudinal section through the double acting jack in down locked position.

Figure III is an enlarged section of the down lock mechanism at the moment of release.

Figure IV is a section similar to Figure III showing the jack partially extended.

Figure V is a section on the line V—V of Figure III to more clearly show the arrangement of the locking balls.

As shown—

The hydraulic lock for an extensible hydraulic jack or operating cylinder is shown as operating a folding drag strut 10 and 11 which in turn retracts or extends a conventional shock strut 12 carrying a landing wheel 13 at its lower end, the upper end of the strut 12 being supported in a bracket 14 pivoted to the airplane structure.

Upon folding of the drag strut, as indicated by the dotted line position in Figure I, the shock strut is pivoted back and upward to house the wheel and strut within a streamlined fairing, such as the engine nacelle tail cone in the case of a main wheel in a multi-motored airplane. The particular strut combination illustrated is taken from a commercial design, and the present invention relates to a hydraulic lock applied to the operating cylinder to hold the strut fully extended or retracted. While the lock may be used either as a down or up lock, I have chosen to illustrate it as a down lock, since the landing gear will be retracted only during flight, when hydraulic pressure will be available to hold the landing gear retracted. A down lock is necessary to prevent collapse of the gear when the airplane is resting thereon, as the hydraulic system may then lack the necesary pressure to hold the gear extended.

In the gear arrangement chosen for illustrative purposes, an operating cylinder 15 is pivoted at 16, near its center, to the airplane structure and has a piston 17 and associated tube 18 connected to a bracket 19 which links the two parts 11 and 12 of the drag link together. When the piston 18 is bottomed within the cylinder 15, as shown in Figures I to III inclusive, the two part drag link is straightened out, and in fact carried slightly past center to further guarantee against strut collapse.

Retraction of the piston 17 and tube 18 into the cylinder is accomplished by applying hydraulic pressure at an inlet 20 near the left end of the cylinder 15. Contrawise, extension of the tube 18, which retracts the landing gear, is accomplished by applying hydraulic pressure through a connection 21 at the right end of the cylinder, as will be described in connection with the down lock.

In what follows it will be convenient to remember that retraction of the operating cylinder extends or lowers the landing gear and vice versa. Since the disclosed embodiment of the invention relates to the down or gear extended position, further description will relate to the operation of the cylinder per se.

The right hand end of the cylinder 15 is closed by a passaged member 22 to which the hydraulic connection 21 is made, the left end of the member 22 extending into the cylinder and being radially apertured for balls 23. The balls 23 are radially movable and in their outer position engage within an internally grooved cup 24 carried by the inner end of the tube 18 when the latter is fully retracted. When so engaged the balls lock the tube against extension. The balls in turn are normally held in this locking position by means of shoulder 25 on a reciprocable plunger 26 which is urged into locking position by a spring 27 retained by a cap 28. The right end 29 of the plunger is allowed to project through the cap and by its position indicates whether the lock is engaged. For convenience the projecting end 29 may be painted red in order to stand out as a warning when the lock is disengaged, as indicated in Figures III and IV.

The reciprocating plunger 26 carries a piston 30 to the right of the hydraulic connection 21, which piston is arranged with a shoulder 31 limiting the range of movement of the plunger. The spring 27, previously mentioned, acts between the cap 28 and the piston 30 and is desirably so proportioned as to respond to a moderate fluid pressure applied through the connection 21, to allow such fluid pressure, acting on the piston 30, to pull the plunger to the right into the position of Figure III, where the balls 23 can move inwardly to release the grooved cup 24. In the design chosen for illustrative purposes the plunger retracts at about 75 lbs. per square inch fluid pressure, while 1,500 lbs. per square inch pressure is available for the operation of the main cylinder piston 17. Such a pressure differential assures release of the lock before pressure is applied to the actual operating mechanism.

A further feature preventing the application of pressure to the piston 17 before the lock is released resides in a valve 32 slideable on the plunger 26 and normally seating against a shoulder 33 in the passaged member 22 to prevent fluid from the connection 21 from reaching the piston 17. Upon retraction of the plunger 26 a shoulder 34 thereon unseats the valve 32 and allows fluid to flow past the valve, through holes 35 in the plunger 26 into the interior thereof and thence against the plugged end of the tube 18. In order to permit the fluid to work against the piston to initiate the movement thereof, a series of radial holes 36 are provided in the cup member 24.

In order to retain the balls 23 in unlocked position, and thus prevent the plunger 26 from moving to the left upon loss of hydraulic pressure from any cause, a sliding sleeve 37 is mounted on the inward extension of the end member 22 and is caused to follow the cup member 24 and override the balls by a spring 38 during the initial movement of the piston, the movement of the sleeve being limited by a counterbore 39 which engages the balls 23. Thus the down lock, which is self energizing upon release of pressure through the hydraulic connection 21, is prevented from premature operation that would prevent a full extension of the landing gear.

In the operation of the hydraulic lock of this invention, assume that the landing gear is being lowered by a retraction of the piston 17 and tube 18 into the cylinder 15 by the application of fluid pressure to the connection 20. As the piston 17 and the cup 24 approach the "bottoming" position, such as moving to the right from the position shown in Figure IV to that shown in Figure III, the cup 24 contacts and pushes the sleeve 37 to the right as the cup 24 moves into position over the balls 23. This allows the plunger 26 to move to the left under the influence of its spring, the shoulder 25 thereon forcing the balls 23 outwardly into locking position in the groove in the cup 24, as shown in Figure II.

Conversely, when hydraulic pressure is applied through the connection 21, to retract the landing gear, the plunger 26 is first moved to the right as in Figure III, releasing the balls 23 from the cup groove and simultaneously admitting hydraulic fluid pressure against the right side of the piston 17 to force the same to the left; the sleeve 37 following the cup until it locks the balls 23 in their retracted positions.

It will thus be seen that I have invented a hydraulic lock for hydraulic operating cylinders that is positive in action and is energized by the operating fluid prior to the actuation of the operating cylinder mechanism, thus enabling the lock to function before stress is applied thereto.

Having thus described my invention and the present preferred embodiments thereof, I desire to emphasize the fact that many modifications may be resorted to in a manner limited only by a just interpretation of the following claims.

I claim as my invention:

1. A hydraulic lock for a hydraulic actuating cylinder and piston mechanism, comprising two relatively movable parts in the cylinder, one carried by the cylinder, the other carried by the piston, radially movable locking means on said part which is carried by the cylinder and engageable between said relatively movable parts at one extreme of their movement, means for projecting said locking means, hydraulic means associated with said projecting means and so constructed and arranged as to retract the same when subjected to hydraulic pressure, and means so constructed and arranged as to hold said radially movable locking means retracted when said relatively movable parts are displaced from their extreme position.

2. A hydraulic lock for a hydraulic actuating cylinder and piston mechanism, comprising two relatively movable parts in the cylinder, one carried by the cylinder, the other carried by the piston, radially movable locking means on said part which is carried by the cylinder and engageable between said relatively movable parts at one extreme of their movement, means for projecting said locking means, hydraulic means associated with said projecting means and so constructed and arranged as to retract the same when subjected to hydraulic pressure, and valve means associated with said projecting means so constructed and arranged as to prevent access of hydraulic fluid to the actuating cylinder while said lock is engaged.

3. A hydraulic lock for a hydraulic actuating cylinder and piston mechanism, comprising two relatively movable parts in the cylinder, one on the cylinder the other on the piston, radially movable locking means carried by said part which is on the cylinder and engageable between said relatively movable parts at one extreme of their movement, means for projecting said locking means, hydraulic means associated with said projecting means and so constructed and arranged as to retract the same when subjected to hydraulic pressure, valve means associated with said projecting means so constructed and arranged as to prevent access of hydraulic fluid to the actuating cylinder while said lock is engaged, and means so constructed and arranged as to hold said radially movable locking means retracted when said relatively movable parts are displaced from their extreme position.

4. In combination with a hydraulic cylinder and a piston movable therein, an end closure for said cylinder having an inward extension, radially movable locking members carried by said extension, an internally grooved member carried by the piston and arranged to overlap the inward extension in one extreme position of the piston to align with said radially movable locking members, and means for shifting said radially movable members into locking engagement with said grooved member, said last mentioned means being longitudinally movable within said inward extension to control said radially movable members.

5. In combination with a hydraulic cylinder and a piston movable therein, an end closure for said cylinder having an inward extension, radially movable locking members carried by said extension, an internally grooved member carried by the piston and arranged to overlap the inward extension in one extreme position of the piston to align with said radially movable locking members, means for shifting said radially movable members into locking engagement with said grooved member, said last mentioned means being longitudinally movable within said inward extension to control said radially movable members, said shifting means having an extension projecting through said end closure whereby to visually indicate the operating position of said locking members.

6. In combination with a hydraulic cylinder and a piston movable therein, an end closure for said cylinder having an inward extension, radially movable locking members carried by said extension, an internally grooved member carried by the piston and arranged to overlap the inward extension in one extreme position of the piston to align with said radially movable locking members, means for shifting said radially movable members into locking engagement with said grooved member, said last mentioned means being longitudinally movable within said inward extension to control said radially movable members, and valve means operatively associated with said shifting means and so constructed and arranged as to shut off admission of fluid to the hydraulic cylinder until unseated by the unlocking movement of the shifting means.

7. In combination with a hydraulic cylinder and a piston movable therein, an end closure for said cylinder having an inward extension, radially movable locking members carried by said extension, an internally grooved member carried by the piston and arranged to overlap the inward extension in one extreme position of the piston to align with said radially movable locking members, means for shifting said radially movable members into locking engagement with said grooved member, said last mentioned means being longitudinally movable within said inward extension to control said radially movable members, and valve means operatively associated with said shifting means and so constructed and arranged as to shut off admission of fluid to the hydraulic cylinder until unseated by the unlocking movement of the shifting means, said shifting means having an extension projecting through said end closure whereby to visually indicate the operating position of said locking members.

8. A hydraulically releasable lock for a reciprocating member, including an element movable with said member, and locking means for cooperating with said element, comprising radially movable locking members, a stationary annular housing having radial passages for said locking members, a spring loaded plunger reciprocable in said housing adapted in its extended position to force said locking members outwardly in their passages to lock with said element, and hydraulically operable means so constructed and arranged as to retract said plunger to allow retraction of said locking members.

9. A hydraulically releasable lock for a reciprocating member, including an element movable with said member, and locking means for cooperating with said element, comprising radially movable locking members, a stationary annular housing having radial passages for said locking members, a spring loaded plunger reciprocable in said housing adapted in its extended position to force said locking members outwardly in their passages into locking engagement with said element, hydraulically operable means so constructed and arranged as to retract said plunger to allow retraction of said members, and means so constructed and arranged as to prevent the extension of said spring loaded plunger when said reciprocating member is not at the extremity of its movement.

10. A lock for a hydraulic mechanism having relatively movable cylinder and piston elements comprising parts on said elements adapted to engage one within the other when said elements are at one extreme of their relative movement, locking means carried by one of said parts and movable from a retracted position to a locking position where it engages between the parts to hold said elements against relative movement, means carried by a part for moving the locking means to the locking position, means for restoring the last named means to allow the locking means to return to the retracted position, and a separate means for holding the locking means in the retracted position when relative movement between the elements displaces them from said extreme positions.

11. A lock for a hydraulic mechanism having relatively movable cylinder and piston elements comprising parts on said elements adapted to engage one within the other when said elements are at one extreme of their relative movement, locking means carried by one of said parts and movable from a retracted position to a locking position where it engages between the parts to hold said elements against relative movement, means carried by a part for moving the locking means to the locking position, fluid pressure actuated means restoring the last named means to allow the locking means to return to the retracted position, and spring urged means for holding the locking means in its retracted position when relative movement displaces the elements from said extreme position.

12. A lock for a hydraulic mechanism having relatively movable cylinder and piston elements comprising a part on one element, a carrier on the other element, the part and carrier being within the cylinder and being related to engage one within the other when the elements are at one extreme of their relative movement, movable locking means on the carrier movable between a retracted position where it does not resist relative movement between the elements and a locking position where it engages between the carrier and part to lock the elements against relative movement, means supported by the carrier for moving the locking means to its locking position, fluid pressure actuated means for restoring the last named means to allow the locking means to return to its retracted position, and means supported by the carrier for holding the locking means in its retracted position when the elements are relatively displaced from said extreme position.

WILLARD A. ASHTON.